United States Patent
Rabasco et al.

(10) Patent No.: US 10,800,932 B2
(45) Date of Patent: *Oct. 13, 2020

(54) COATING FORMULATION WITH A POLY(OXYALKYLENE-URETHANE) ASSOCIATIVE THICKENER MODIFIED WITH A HYDROPHOBIC OLIGOMER

(71) Applicants: Dow Global Technologies LLC, Midland, MI (US); Rohm and Haas Company, Collegeville, PA (US)

(72) Inventors: John J. Rabasco, Allentown, PA (US); Duane R. Romer, Midland, MI (US); Joey W. Storer, Midland, MI (US); Antony K. Van Dyk, Blue Bell, PA (US); Wenqin Wang, Phoenixville, PA (US); Mark Langille, Kissimmee, FL (US); Jessica Levin, Philadelphia, PA (US)

(73) Assignees: Rohm and Haas Company, Collegeville, PA (US); Dow Global Technologies LLC, Midland, MI (US)

(*) Notice: Subject to any disclaimer, the term of this patent is extended or adjusted under 35 U.S.C. 154(b) by 36 days.

This patent is subject to a terminal disclaimer.

(21) Appl. No.: 16/254,723

(22) Filed: Jan. 23, 2019

(65) Prior Publication Data

US 2019/0233663 A1  Aug. 1, 2019

Related U.S. Application Data

(60) Provisional application No. 62/624,287, filed on Jan. 31, 2018.

(51) Int. Cl.
| | | |
|---|---|---|
| *C09D 7/43* | (2018.01) | |
| *C09D 7/65* | (2018.01) | |
| *C09D 133/00* | (2006.01) | |
| *C09D 7/00* | (2018.01) | |

(52) U.S. Cl.
CPC ............... *C09D 7/43* (2018.01); *C09D 7/00* (2013.01); *C09D 7/65* (2018.01); *C09D 133/00* (2013.01)

(58) Field of Classification Search
None
See application file for complete search history.

(56) References Cited

U.S. PATENT DOCUMENTS

| | | | |
|---|---|---|---|
| 4,346,201 A * | 8/1982 | Simms | C08F 293/00 525/127 |
| 5,128,433 A | 7/1992 | LeCompte et al. | |
| 5,169,719 A * | 12/1992 | Balatan | C08F 290/067 427/427.5 |
| 2007/0128372 A1 | 6/2007 | Wirth et al. | |
| 2010/0076145 A1* | 3/2010 | Bobsein | C09D 5/024 524/505 |
| 2010/0227953 A1* | 9/2010 | Bobsein | C09D 143/02 524/27 |
| 2012/0302148 A1 | 11/2012 | Bajaj et al. | |
| 2018/0057698 A1* | 3/2018 | Hawkins | C08G 18/12 |
| 2019/0135964 A1* | 5/2019 | Rabasco | C08G 18/4833 |

FOREIGN PATENT DOCUMENTS

CN  102174163 A  *  9/2011

OTHER PUBLICATIONS

Machine translation of CN 102174163 A, retrieved Apr. 2020 (Year: 2020).*
RHOPLEX TM SC-30 Acrylic Emulsion Technical Data Sheet, Dow Inc. date unknown.*

* cited by examiner

*Primary Examiner* — Nicole M. Buie-Hatcher
(74) *Attorney, Agent, or Firm* — Reid S. Willis

(57) ABSTRACT

The present invention relates to a composition comprising a) an aqueous dispersion of polymer particles and b) a hydrophobically modified poly(oxyalkylene-urethane) rheology modifier having a 1) backbone; and 2) a hydrophobic portion represented by Fragment I:

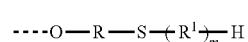

where R and $R^1$ are defined herein. The composition is useful as an aqueous coating formulation that exhibits a highly shear thinning rheology profile suitable for spray applications to provide high sag resistance without adverse impact on gloss or corrosion resistance.

10 Claims, No Drawings

COATING FORMULATION WITH A POLY(OXYALKYLENE-URETHANE) ASSOCIATIVE THICKENER MODIFIED WITH A HYDROPHOBIC OLIGOMER

The present invention relates to an aqueous coating formulation comprising a poly(oxyalkylene-urethane) based associative thickener modified with a hydrophobic oligomer. The formulation is useful for industrial applications that require a highly shear-thinning rheology profile and high sag resistance, such as spray applied metal coatings on vertical surfaces.

Hydrophobically modified, poly(oxyalkylene-urethane) based associative thickeners, more particularly hydrophobically modified, polyethylene oxide urethane based associative thickeners (HEURs) are often preferred as thickening agents for paints because of the good flow and leveling they provide to the paint, coupled with acceptable sag resistance. However, the viscosity of a HEUR-thickened coating formulation does not typically exhibit a highly shear thinning rheology profile required for spraying thick films on vertical surfaces. This undesirable effect is particularly troublesome for industrial, aqueous coating formulations that contain solvent at a volatile organic compound (VOC) concentration greater than 50 g/L. Highly shear-thinning rheology modifiers are therefore needed to provide sufficient low shear (<1 s$^{-1}$) viscosity to deliver high sag resistance and resistance to sedimentation, while still maintaining lower viscosities at mid-shear (KU, 80-100 s$^{-1}$) and high shear (ICI, ~10,000 s$^{-1}$). Such rheology modifiers would be especially beneficial for spray application of thick coatings on vertical surfaces, which requires both high sag resistance and ease of spray application.

Hydroxyethyl cellulose (HEC), alkali soluble/swellable emulsions (ASEs), hydrophobically modified alkali swellable emulsions (HASEs), and inorganic rheology modifiers, such as clays or silicas, which are other types of thickeners commonly used in aqueous coating formulations, could provide a more shear-thinning rheology profile than HEURs; however, these thickeners tend to adversely impact the gloss and/or barrier properties of the coating, such as corrosion resistance.

It would therefore be an advance in the art of coating compositions to develop a HEUR-containing aqueous coating formulation that can exhibit a highly shear thinning rheology profile suitable for spray application, thereby providing high sag resistance and greater flexibility of solvent choices in the formulation, without adverse impact on gloss or corrosion resistance.

SUMMARY OF THE INVENTION

The present invention addresses a need in the art by providing a composition comprising an aqueous dispersion of a) 10 to 60 weight percent, based on the weight of the composition, of polymer particles; and b) from 0.02 to 2 weight percent, based on the weight of the composition, of a hydrophobically modified poly(oxyalkylene-urethane) rheology modifier having 1) a backbone; and 2) a hydrophobic portion represented by fragment I:

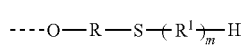

I where R is a $C_2$-$C_{20}$ divalent hydrocarbyl group; each $R^1$ independently comprises a biradical of a primary monomer selected from the group consisting of i) methyl methacrylate; ii) methyl acrylate; iii) ethyl acrylate; iv) butyl methacrylate; v) butyl acrylate; vi) 2-ethylhexyl acrylate; and vii) 2-propylheptyl acrylate; and m is from 5 to 20; wherein the dotted line is the point of attachment of fragment I to the backbone of the rheology modifier.

The paint composition of the present invention addresses a need in the art by providing highly shear thinning rheology profile for aqueous coatings containing a HEUR rheology modifier, as well as high sag resistance with greater flexibility of solvent choices in the formulation.

DETAILED DESCRIPTION OF THE INVENTION

The present invention is a composition comprising an aqueous dispersion of a) 10 to 60 weight percent, based on the weight of the composition, of polymer particles; and b) from 0.02 to 2 weight percent, based on the weight of the composition, of a hydrophobically modified poly(oxyalkylene-urethane) rheology modifier having 1) a backbone; and 2) a hydrophobic portion represented by fragment I:

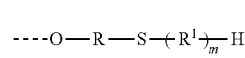

I where R is a $C_2$-$C_{20}$ divalent hydrocarbyl group; each $R^1$ independently comprises a biradical of a primary monomer selected from the group consisting of i) methyl methacrylate; ii) methyl acrylate; iii) ethyl acrylate; iv) butyl methacrylate; v) butyl acrylate; vi) 2-ethylhexyl acrylate; and vii) 2-propylheptyl acrylate; and m is from 5 to 20; wherein the dotted line is the point of attachment of Fragment I to the backbone of the rheology modifier.

The term "structural unit" of the named monomer refers to the remnant of the monomer after polymerization. For example, a structural unit of methyl methacrylate is as illustrated:

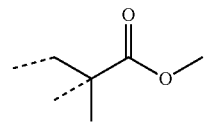

where the dotted lines represent the points of attachment of the structural unit to the polymer backbone.

Preferably, the polymer particles comprise at least 30, more preferably at least 40 weight percent, and most preferably at least 50 weight percent structural units of acrylate and methacrylate monomers or preferably comprise at least 30, more preferably at least 50 weight percent structural units of a vinyl ester monomer. Examples of suitable acrylate and methacrylate monomers include methyl methacrylate, ethyl methacrylate, butyl methacrylate, ureido methacrylate, methyl acrylate, ethyl acrylate, butyl acrylate, 2-ethylhexyl acrylate, and 2-propylheptyl acrylate. Preferred combinations of acrylate and methacrylate monomers include one or more monomers selected from the group consisting of ethyl acrylate, butyl acrylate, ureido methacrylate, 2-propylheptyl acrylate, 2-ethylhexyl acrylate, and styrene. More preferred combinations of acrylic monomers include methyl methacrylate and butyl acrylate; methyl methacrylate and 2-ethylhexyl acrylate; and methyl methacrylate, butyl acrylate, and ethyl acrylate, with the combination of methyl methacrylate and butyl acrylate being most preferred. Examples of vinyl ester-based monomers include vinyl acetate and vinyl versatates. An example of a vinyl ester-based copolymer is vinyl acetate-ethylene (VAE).

The polymer particles may also include structural units of other monomers such as styrene, acetoacetoxyethyl methacrylate, acrylonitrile, acrylamide, and 2-acrylamido-2-methylpropane sulfonic acid. Additionally, the polymer particles preferably comprises from 0.2, more preferably from 0.5, and most preferably from 1 weight percent, to preferably 5, and more preferably to 3 weight percent structural units of an ethylenically unsaturated carboxylic acid monomer or phosphoric acid monomer or a combination thereof, such as acrylic acid, methacrylic acid, itaconic acid or 2-phosphoethyl methacrylate.

The hydrophobically modified poly(oxyethylene-urethane) is a poly(oxyethylene-urethane), a poly(oxypropylene-urethane), or a poly(oxybutylene-urethane), preferably a poly(oxyethylene-urethane) (a HEUR) modified with the hydrophobe of Fragment I. Preferably, the composition comprises from 0.05 to 1 weight percent of the hydrophobically modified alkylene oxide urethane polymer, preferably the hydrophobically modified ethylene oxide urethane polymer based on the weight of the composition.

The hydrophobically modified alkylene oxide urethane polymer is advantageously by contacting together under reactive conditions a) a diisocyanate; b) a water-soluble polyalkylene glycol; and c) a capping agent which is a compound of formula I:

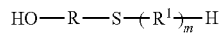

I

Examples of suitable diisocyanates include 1,4-tetramethylene diisocyanate, 1,6-hexamethylene diisocyanate (HDI), 2,2,4-trimethyl-1,6-diisocyanatohexane, 1,10-decamethylene diisocyanate, 4,4'-methylenebis(isocyanatocyclohexane) ($H_{12}$-MDI), 2,4'-methylenebis(isocyanatocyclohexane), 1,4-cyclohexylene diisocyanate, 1-isocyanato-3-isocyanatomethyl-3,5,5-trimethylcyclohexane (IPDI), m- and p-phenylene diisocyanate, 2,6- and 2,4-toluene diisocyanate (TDI), xylene diisocyanate, 4-chloro-1,3-phenylene diisocyanate, 4,4'-methylene diphenyl diisocyanate (MDI), 1,5-naphthylene diisocyanate, and 1,5-tetrahydronaphthylene diisocyanate. Examples of commercially available diisocyanates are Desmodur W cycloaliphatic diisocyanate (DesW) and Desmodur H (HDI).

A water-soluble polyalkylene glycol refers to water-soluble polyethylene oxides, water-soluble polyethylene oxide/polypropylene oxide copolymers, and water-soluble polyethylene oxide/polybutylene oxide copolymers. Preferred water-soluble polyalkylene oxides are polyethylene glycols, particularly polyethylene glycols having a weight average molecular weight in the range of from 600 to 12,000 Daltons. An example of a suitable polyethylene glycol is PEG 8000, which is commercially available as CARBOWAX™ 8000 Polyethylene Glycol (PEG-8000, a trademark of The Dow Chemical Company or its affiliates).

The diisocyanate, the polyalkylene glycol, and the capping agent of Formula I are contacted under reaction conditions to form the hydrophobically modified alkylene oxide urethane polymer. Preferably, the weight average molecular weight ($M_w$) of the hydrophobically modified alkylene oxide urethane polymer, as determined size exclusion chromatography (SEC) as described herein, is in the range of from 2000, more preferably from 4000 Daltons, to preferably 80,000, more preferably to 60,000 Daltons.

The compound of formula I is advantageously prepared by reacting at least one primary monomer selected from the group consisting of methyl methacrylate, ethyl acrylate, butyl methacrylate, butyl acrylate, 2-ethylhexyl acrylate, and 2-propylheptyl acrylate with a mercaptoalkanol (HO—R—SH) under radical initiated polymerization conditions.

The reaction mixture may optionally include one or more ancillary monomers with the proviso that the total number of biradicals in formula I does not exceed 20. Accordingly, from 1 to 15 biradicals of the hydrophobe may comprise biradicals of one or more ancillary monomers, examples of which include $C_1$-$C_{18}$-alkyl acrylates and methacrylates (other than primary monomers); and $C_1$-$C_{18}$-alkylaryl acrylates and methacrylates; $C_1$-$C_3$-dialkylamino-$C_1$-$C_{18}$-alkyl acrylates and methacrylates; $C_1$-$C_{30}$-alkoxy-$(CH_2CH_2O)_z$—$CH_2CH_2$-acrylates and -methacrylates, aryloxy-$(CH_2CH_2O)_z$$CH_2CH_2$-acrylates and -methacrylates, and $C_1$-$C_{30}$-dialkylamino-alkoxy-$(CH_2CH_2O)_z$—$CH_2CH_2$-acrylates and -methacrylates, where z is from 0 to 50; glycidyl acrylate, glycidyl methacrylate; acid monomers and salts thereof such as acrylic acid, methacrylic acid, and itaconic acid, as well as salts thereof; and styrene.

As used herein, the term "biradical" is used to refer to the remnant of the recited monomer in the hydrophobe; thus, a biradical of methyl methacrylate is shown below:

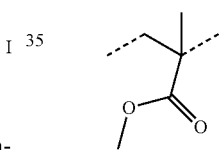

Biradical of Methyl Methacrylate where the dotted lines represent the points of attachment to the other units in the hydrophobe. Biradicals of other monomers are readily discerned by this description.

When $R^1$ is a biradical of methyl methacrylate, m is preferably in the range of 9, more preferably from 12, to 20; when $R^1$ is a biradical of butyl methacrylate, m is preferably in the range of 7, more preferably from 8, more preferably from 9, to 20, more preferably to 16. When $R^1$ is a biradical of 2-ethylhexyl acrylate or 2-propylheptyl acrylate, m is preferably in the range of from 5 to 15. Though not bound by theory, it is believed that the degree of polymerization (m) necessary to achieve the desired properties is dependent upon the hydrophobicity of the biradical. The more hydrophobic the biradical, the lower the degree of polymerization required to achieve the desired viscosities and sag properties in the finally formulated paint.

The composition of the present invention may further comprise other components including surfactants, coalescents, defoamers, biocides, colorants, pigments, solvents, and extenders. The composition shows surprising highly shear thinning rheology profile and improved sag resistance over compositions that contain HEURs that are not modified with the hydrophobic portion of Fragment 1.

Molecular Weight Measurements

A. Molecular Weight Measurement of Hydroxy Terminated Acrylic Oligomers by Electrospray Ionization-Liquid Chromatography-Mass Spectrometry (ESI-LC-MS): $M_w$<1500 Daltons Samples were prepared by dissolving the hydroxyl terminated acrylic oligomers at a concentration of 5 mg/mL in THF.

Instrument. Thermo Q Exactive Orbitrap mass spectrometer interfaced with a Thermo-Dionex Ultimate 3000 liquid chromatograph system via a high voltage electrospray ionization source operating in positive ion mode.

LC Conditions

Column: Agilent Zorbax SB C3, 150×4.6 mm, 5 μm, Temp. 45° C.

Mobile Phase: A: water/methanol (40/60 v/v) with 1 g/L ammonium acetate, and B: THF; Gradient: 20% B (2.5 min) to 45% B, then to 95% B within 10 min and hold for 10 min before coming back to the initial condition; flow rate: 0.7 mL/min. An aqueous ammonium acetate solution (1 g/L) was post added to the eluent through a tee at 0.2 mL/min.

Diode array UV detector: 210 nm-500 nm

Injection volume: 0.5 μL

ESI Conditions

Spray voltage (+): 3500 V; Capillary temperature: 320° C.; Sheath gas: 60; Auxiliary gas: 20; Sweep gas: 3; probe heater temperature: 300° C.; S-Lens RF Level: 50 V MS Conditions Full MS/dd-MS/MS Mode In-source CID: 0 eV; Default charge state: 1; Full MW resolution: 35,000; AGC target: 1e6; Maximum IT: 125 ms dd-MS/MS resolution: 17,500; maximum IT: 75 ms; Loop count: 3; MSX count: 1; TopN: 3; Isolation window: 5.0 m/z; NCE: 40 V; Stepped NCE: 50%

B. Molecular Weight Measurement of Hydroxy Terminated Acrylic Oligomers by Size Exclusion Chromatography (SEC): $M_w$>1500 Daltons and hydroxyl terminated acrylic oligomers containing styrene Samples were prepared by dissolving the hydroxyl terminated acrylic oligomers at a concentration of 1 mg/mL in THF.

SEC Conditions:

Eluent: tetrahydrofuran

Columns: 2 Polymer Labs Mixed E columns+1 Polymer Labs 100A column, 45° C.

Flow rate: 1 mL/min

Injection volume: 100 μL

Detection: RI & UV @ 260 nm

Software: Polymer Labs Cirrus version 3.3

Calibration: 8 PMMA standards ranging from 0.625 kg/mol to 30.53 kg/mol, 3rd order polynomial fit LC: Waters e2695/Shodex RI-201/Waters 2489

C. Molecular Weight Measurement of HEUR Polymers by Size Exclusion Chromatography Samples were prepared by dissolving 1-2 mg of polymer/g of 100 mM ammonium acetate in methanol. Samples were brought into solution by shaking overnight on a mechanical shaker at room temperature. Sample solutions were filtered using 0.45 μm PTFE filter.

Separations were carried out on a Waters Acquity APC system consisting of an isocratic pump, degasser, injector, column oven and both UV and RI detectors operated at 40° C. System control, data acquisition, and data processing were performed using version 3 of Empower software (Waters, Milford, Mass.). SEC separations were performed in 100 mM ammonium acetate in methanol (Optima grade from Fisher) at 0.5 mL/min using an APC column set composed of two Water APC columns (150×4.6 mm ID) packed with BEH Diol particles (pore size marked as BEH 200 Å and BEH 450 Å, particle size 1.7 μm and 2.5 μm, respectively) purchased from Waters (Milford, Mass.). 20 μL of sample were injected for APC separations.

A 12-point calibration curve of $3^{rd}$ order was obtained from narrow polyethylene oxide (PEO) standards.

EXAMPLES

Intermediate Example 1—Preparation of a Hydroxyl Terminated Butyl Methacrylate Oligomer A degassed solution of azobisisobutyronitrile (AIBN, 0.042 g, 0.26 mmol), butyl methacrylate (14.56 g, 102.39 mmol) and 2-mercaptoethanol (1.00 g, 12.80 mmol) in toluene (20 mL) was added dropwise over 4 h to refluxing toluene (30 mL). After completion of addition, the resulting mixture was refluxed overnight. The mixture was cooled to room temperature and diluted with toluene (150 mL). The toluene solution was washed with 5% aqueous $Na_2CO_3$, then washed with water, partially dried, and then further concentrated to dryness in vacuo, giving a viscous, clear oil (13.64 g). $M_w$ was measured to be 1287 Daltons and $M_n$ as 903 Daltons by SEC. The average degree of polymerization (dp) was calculated as 8.4 based on $M_w$.

Intermediate Example 2—Preparation of a Hydroxyl Terminated Butyl Methacrylate Oligomer The synthetic procedure described in Intermediate Example 1 was substantially followed with the following changes: AIBN (0.032 g, 0.19 mmol), butyl methacrylate (16.38 g, 115.19 mmol) and 2-mercaptoethanol (0.75 g, 9.6 mmol). The final product (14.9 g) was isolated as a viscous, clear oil; $M_w$ was measured to be 1565 Daltons and $M_n$ as 976 Daltons by SEC. Average dp was calculated as 10.3 based on $M_w$.

Intermediate Example 3—Preparation of a Hydroxyl Terminated Methyl Methacrylate Oligomer A 250 mL three neck round bottomed flask was fitted with a Dean Stark trap, a Teflon stopper, and a nitrogen purge/sparge feed. HPLC grade toluene (52 g) was charged to the reaction flask along with methyl methacrylate (17.1 g) and 2-mercaptoethanol (1.11 g). The mixture was dried by azeotropic distillation at 84° C. for 1 h. The temperature was reduced to 70° C. during the addition of radical initiator. The radical initiator VAZO 52 (2,2'-azobis(2,4-dimethylvaleronitrile, 0.35 g) was prepared in 5 mL of fresh dry toluene and then added to the reaction mixture in thirds every 15 min over a period of 45 min. The reaction was then heated back to 80° C. and stirred for an additional 60 min before cooling to room temperature. The reaction mixture was washed with 25 wt % sodium carbonate and then with deionized water to remove unreacted 2-mercaptoethanol. The solvent was removed in vacuo and the resultant white solid was collected (16.45 g); $M_w$ was measured to be 1070 and $M_n$ as 833 Daltons by ESI-MS. Average dp was calculated as 9.7 based on $M_w$.

Intermediate Example 4—Preparation of a Hydroxyl Terminated Methyl Methacrylate Oligomer A 250-mL three neck round bottomed flask was fitted with a Dean Stark trap, a Teflon stopper, and a nitrogen purge/ sparge feed. HPLC grade toluene (52 g) was charged to the reaction flask along with methyl methacrylate (25.7 g) and 2-mercaptoethanol (1.11 g). The mixture was dried by azeotropic distillation at 84° C. for 1 h. The temperature was reduced to 70° C. during the addition of radical initiator. The radical initiator VAZO 52 initiator (0.70 g) was prepared in 5 mL of fresh dry toluene and then added to the reaction mixture in thirds every 15 min over a period of 45 min. The reaction was then heated back to 80° C. and allowed to stir for an additional 60 min before cooling to room temperature. The reaction mixture was washed with 25 wt % sodium carbonate and then with deionized water to remove unreacted 2-mercaptoethanol. The solvent was removed in vacuo and the resultant white solid was collected (21.3 g); $M_w$ was measured to be 1730 Dalton and $M_n$ as 1220 Daltons by ESI-MS. Average dp was calculated as 16.3 based on $M_w$.

Intermediate Example 1A—Preparation of a HEUR Capped with Intermediate Example 1

A mixture of CARBOWAX™ PEG 8000 (PEG 8000, 50.9 g) in toluene (400 g) was heated to reflux, and 150 mL of the toluene was allowed to distill off to dehydrate the PEG. The mixture was cooled to 90° C. and a solution of Desmodur W diisocyanate (2.256 g) in toluene (5 mL) was added to the reactor with stirring for 5 min. Dibutyltin dilaurate (1.48 mg) was then added with stirring for 1 h at 90° C., and the reaction mixture was cooled to 80° C. Intermediate Example 1 (5.492 g) in toluene (20 mL) was then added to the reactor and stirring continued at 80° C. for 2 h. The resulting polymer solution was poured into an evaporating dish and allowed to partially dry overnight. The polymer was chopped up and dried overnight at 45° C. in vacuo to yield a white solid.

Intermediate Example 2A—Preparation of a HEUR Capped with Intermediate Example 2

The procedure was carried out substantially as described in Intermediate Example 1 except as follows: PEG 8000 (50.0 g), Desmodur W diisocyanate (2.16 g), dibutyltin dilaurate (1.452 mg), and Intermediate Example 2 (5.835 g).

Intermediate Example 3A—Preparation of a HEUR Capped with Intermediate Example 3

A 250-mL three neck round bottomed flask was fitted with a Dean Stark trap, a Teflon stopper, and a nitrogen purge/sparge feed. HPLC grade toluene (175 g) was charged to the reaction flask along with PEG 8000 (60 g). The mixture was dried by azeotropic distillation at 84° C. for 1 h. The solution was cooled to 90° C. followed by the addition of Desmodur W (2.65 g). Dibutyl tin dilaurate (0.08 g) was then added to the reactor with stirring and the reaction mixture was maintained at 90° C. for 1 h and then cooled to 80° C. Intermediate Example 3 (6.61 g, dried in vacuo) was then added to the reaction mixture and stirring was continued at 80° C. for 1 h. The reaction mixture was then cooled to room temperature and the solvent was removed in vacuo; the resulting polymer was allowed to partially dry before being dried in vacuo over 2 d.

Intermediate Example 4A—Preparation of HEUR Capped with Intermediate Example 4

The procedure was carried out substantially as described in Intermediate Example 3A except as follows: toluene (175 g), PEG 8000 (60 g), hexamethylene diisocyanate (HDI, 1.7 g), dibutyltin dilaurate (0.08 g), and Intermediate Example 4 (11.7 g).

All rheology modifier solid polymer samples were dissolved in a mixture of 80% water and 20% Butyl CARBITOL™ Solvent (A Trademark of The Dow Chemical Company or Its Affiliates) to achieve solution of 10% active HEUR solids.

Formulation and Application Data

The associated thickeners were evaluated in the formulation illustrated in Table 1. The master batch excludes the final water and the rheology modifier addition amounts. For each individual rheology modifier evaluated, the amount of final water and rheology modifier added was adjusted to reach the same KU target and same total formula weight.

TABLE 1

Paint Formulation 1

| Ingredient | Wt. (g) |
|---|---|
| Grind | |
| Water | 58.90 |
| DOWANOL ™ DPM Glycol Ether | 17.53 |
| TAMOL ™ 165A Dispersant | 9.25 |
| Ammonia (28%) | 0.97 |
| TRITON ™ HW-1000 Surfactant | 1.46 |
| Tego Foamex 1488 Defoamer | 1.46 |
| Ti-Pure ™ R-706 TiO$_2$ | 189.87 |
| LetDown | |
| MAINCOTE ™ HG-86 Acrylic Resin | 617.59 |
| Water | 5.50 |
| Ammonia (28%) | 2.50 |
| DOWANOL ™ DPnB Glycol Ether | 53.95 |
| Sodium Nitrite (15%) | 8.76 |
| Tego Foamex 1488 Defoamer | 2.43 |
| Rheology Modifier | * |
| Water | * |
| Total | 991.37 |

* Rheology Modifier amounts are shown in Table 2, and the water amounts are adjusted based on the rheology modifier amounts to meet the same total weight of 991.37 g shown in Table 1.

Table 2 illustrates paint formulations (Examples 1A'-4A', and Comparative Examples C1A'-C4A') containing the HEURs. The formulations were prepared with a targeted KU viscosity, and Brookfield viscosities and sag resistances were measured. RM-12W refers to ACRYSOL™ RM-12W (endcapped with a Cis-alkanol), and RM-998 (endcapped with a C$_{16}$-dialkylaminoalkanol) refers to ACRYSOL™ RM-998 Rheology Modifiers (A Trademark of The Dow Chemical Company or Its Affiliates); each of these commercial HEURs are endcapped with a long chain alkanol. The results of this comparative study are shown in Table 2. Ex. No. refers to the paint formulation example number and Int. Ex. refers to the intermediate example number or commercial HEUR; DP refers to the calculated degree of polymerization (n); BF4/6 refers to Brookfield DV-II+Pro Viscometer, spindle #4 at 6 rpm; and Sag refers to Sag resistance as measured ASTM D4400 (Standard Test Method for Sag Resistance in Paints Using a Multinotch Applicator).

TABLE 2

Viscosity and Sag Resistance Comparative Studies

| Ex. No. | Int. Ex. | Hydrophobe (DP) | RM (g) | KU | BF4/6 | Sag |
|---|---|---|---|---|---|---|
| 1A' | 1A | BMA (8.4) | 0.59 | 94.3 | 14997 | 16 |
| 2A' | 2A | BMA (10.3) | 0.8 | 95.2 | 25195 | 24 |

TABLE 2-continued

Viscosity and Sag Resistance Comparative Studies

| Ex. No. | Int. Ex. | Hydrophobe (DP) | RM (g) | KU | BF4/6 | Sag |
|---|---|---|---|---|---|---|
| 3A' | 3A | MMA (9.7) | 0.75 | 96.7 | 8898 | 14 |
| 4A' | 4A | MMA (16.3) | 0.88 | 95.8 | 10998 | 18 |
| C1A' | RM-12W | alkanol | 1.11 | 94.6 | 5699 | 8 |
| C2A' | RM-998 | aminoalkanol | 0.61 | 94 | 5599 | 8 |

The paint formulations using thickeners of the present invention show dramatically improved Brookfield viscosity and sag resistance at the same KU target vs. the comparative examples.

The invention claimed is:

1. A composition comprising an aqueous dispersion of a) 10 to 60 weight percent, based on the weight of the composition, of polymer particles; and b) from 0.02 to 2 weight percent, based on the weight of the composition, of a hydrophobically modified poly(oxyalkylene-urethane) rheology modifier having 1) a backbone; and 2) a hydrophobic portion represented by fragment I:

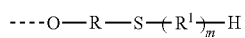

$$\text{----O---R---S---(R}^1)_{\overline{m}}\text{H} \qquad \text{I}$$

where R is a $C_2$-$C_{20}$ divalent hydrocarbyl group; each $R^1$ independently comprises a biradical of a primary monomer selected from the group consisting of i) methyl methacrylate; ii) methyl acrylate; iii) ethyl acrylate; iv) butyl methacrylate; v) butyl acrylate; vi) 2-ethylhexyl acrylate; and vii) 2-propylheptyl acrylate; and m is from 5 to 20; wherein the dotted line is the point of attachment of fragment I to the backbone of the rheology modifier.

2. The composition of claim 1 wherein the hydrophobically modified poly(oxyalkylene-urethane) rheology modifier is a poly(oxyethylene-urethane) rheology modifier.

3. The composition of either of claim 1 wherein each $R^1$ is a biradical of methyl methacrylate; and m is from 9 to 20.

4. The composition of claim 3 wherein m is from 12 to 20.

5. The composition of claim 1 wherein each $R^1$ is a biradical of butyl methacrylate; and m is from 7 to 20.

6. The composition of claim 5 wherein m is from 9 to 16.

7. The composition of claim 1 wherein $R^1$ further comprises from 1 to 15 biradicals of an ancillary monomer selected from the group consisting of $C_1$-$C_{18}$-alkyl acrylates other than primary monomers, $C_1$-$C_{18}$-alkyl methacrylates other than primary monomers; $C_1$-$C_{18}$-alkylaryl acrylates; $C_1$-$C_{18}$-alkylaryl methacrylates; $C_1$-$C_3$-dialkylamino-$C_1$-$C_{18}$-alkyl acrylates; $C_1$-$C_3$-dialkylamino-$C_1$-$C_{18}$-alkyl methacrylates; $C_1$-$C_{30}$-alkoxy-$(CH_2CH_2O)_z$—$CH_2CH_2$-acrylates; $C_1$-$C_{30}$-alkoxy-$(CH_2CH_2O)_z$—$CH_2CH_2$-methacrylates; aryloxy-$(CH_2CH_2O)_z$$CH_2CH_2$-acrylates; aryloxy-$(CH_2CH_2O)_z$$CH_2CH_2$-methacrylates; $C_1$-$C_{30}$-dialkylamino-alkoxy-$(CH_2CH_2O)_z$—$CH_2CH_2$-acrylates; $C_1$-$C_{30}$-dialkylamino-alkoxy-$(CH_2CH_2O)_z$—$CH_2CH_2$-methacrylates; where z is from 0 to 50; glycidyl acrylate, glycidyl methacrylate; acid monomers, salts of acid monomers; and styrene.

8. The composition of claim 1 wherein the polymer particles comprise at least 40 weight percent of structural units of acrylate and methacrylate monomers.

9. The composition of claim 8 wherein the polymer particles comprise methyl methacrylate and one or more acrylates selected from the group consisting of butyl acrylate, 2-ethylhexyl acrylate, and ethyl acrylate.

10. The composition of claim 1 which further includes at least one component selected from the group consisting of surfactants, coalescents, defoamers, biocides, colorants, pigments, solvents, and extenders.

* * * * *